United States Patent [19]

Hutchison

[11] Patent Number: 4,966,239
[45] Date of Patent: Oct. 30, 1990

[54] SOD HARVESTING APPARATUS

[75] Inventor: Marion E. Hutchison, Waterloo, Iowa

[73] Assignee: Tiger Industries, Inc., Waterloo, Iowa

[21] Appl. No.: 380,627

[22] Filed: Jul. 14, 1989

[51] Int. Cl.⁵ .................... B62D 1/26; A01B 45/04
[52] U.S. Cl. .................................. 172/20; 172/26; 180/131; 414/789.7; 414/791.6; 414/792.9; 414/911
[58] Field of Search ............... 172/19, 20, 5, 6, 26; 37/3; 414/502, 540, 789.7, 791.6, 792.9, 911, 927, 792.5, 744.2, 744.3, 744.7, 744.8; 104/244.1; 180/79, 131; 280/776; 171/3

[56] References Cited

U.S. PATENT DOCUMENTS

| | | | |
|---|---|---|---|
| 1,939,472 | 12/1933 | Thiemann | 104/244.1 |
| 3,625,374 | 12/1971 | Hemphill | 414/789.7 |
| 3,653,448 | 4/1972 | Morrill | 172/19 |
| 3,765,501 | 10/1973 | Burvee | 104/244.1 X |
| 3,807,505 | 4/1974 | Nunes | 172/20 |
| 3,877,584 | 4/1975 | Holcombe | 172/19 X |
| 3,887,013 | 6/1975 | Helberg | 172/20 |
| 4,294,316 | 10/1981 | Hedley | 172/20 |
| 4,345,659 | 8/1982 | Arnold | 172/26 X |
| 4,363,583 | 12/1982 | Bontrager | 414/789.7 |
| 4,828,040 | 5/1989 | Schumacher | 172/19 |

OTHER PUBLICATIONS

FMC "Robot Palletizer", Sales Brochure, p. 4, received in US PTO May 1985.

Primary Examiner—Randolph A. Reese
Assistant Examiner—Jeffrey L. Thompson
Attorney, Agent, or Firm—Dean P. Edmundson

[57] ABSTRACT

Self-propelled sod harvesting apparatus for cutting sod from a field into strips and stacking the sod on pallets. The apparatus includes a magazine storage area for pallets, a pallet loading area, and mechanism for transferring a pallet from the storage area to the loading area. A conveyor carries each cut sod strip to a platform and causes the sod to be rolled, and a stacking mechanism is used to collect rolls from the platform and stack them on the pallet. When the pallet is loaded it is discharged onto the ground and a fresh pallet is transferred from the storage area to the loading area. Only one person is required to operate the apparatus.

17 Claims, 15 Drawing Sheets

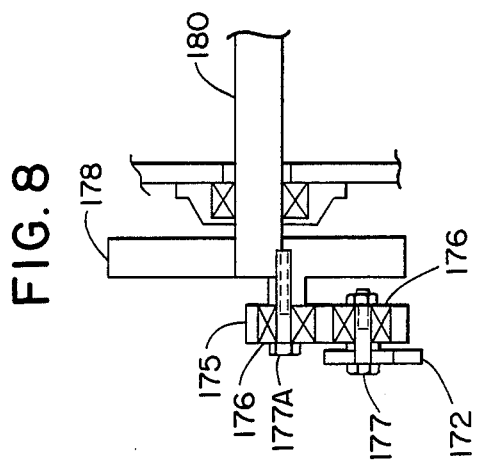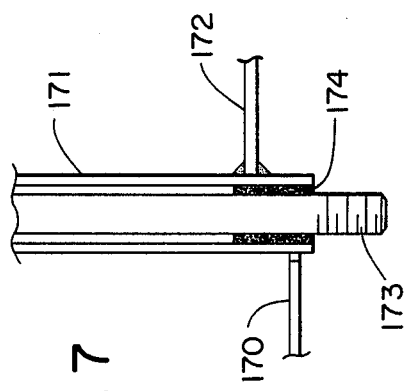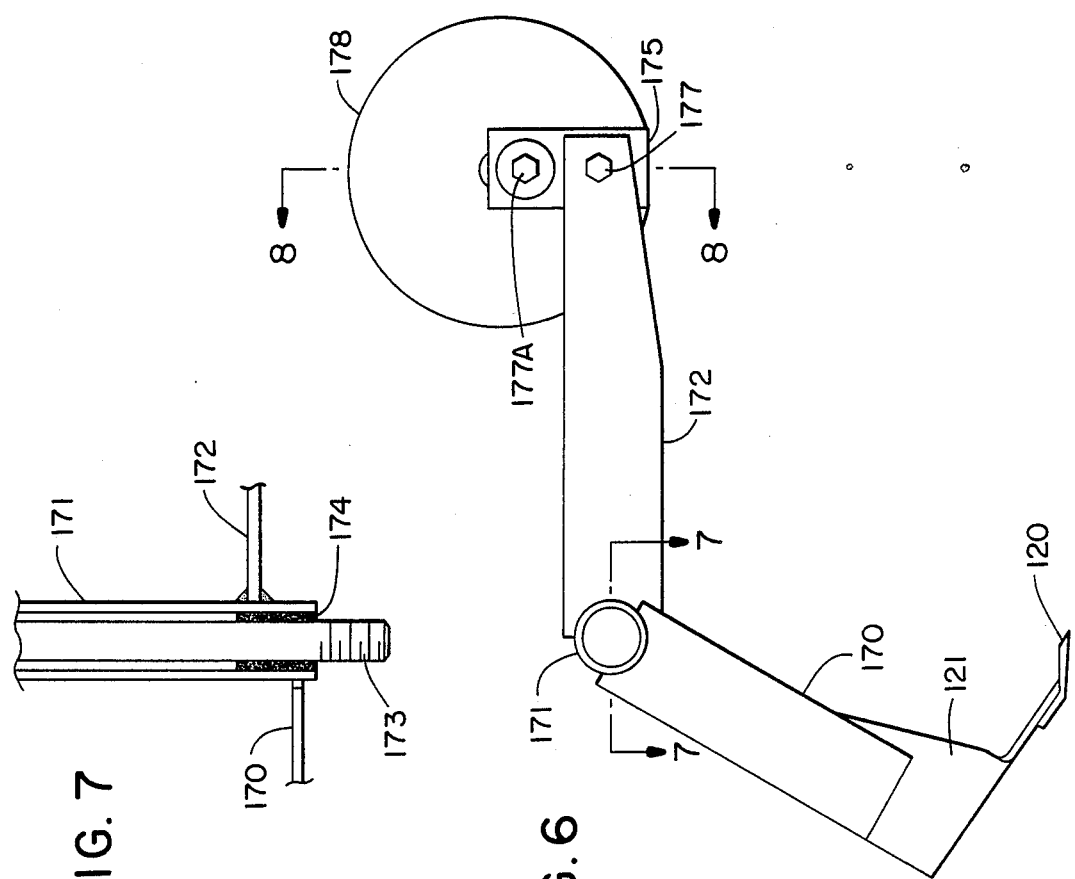

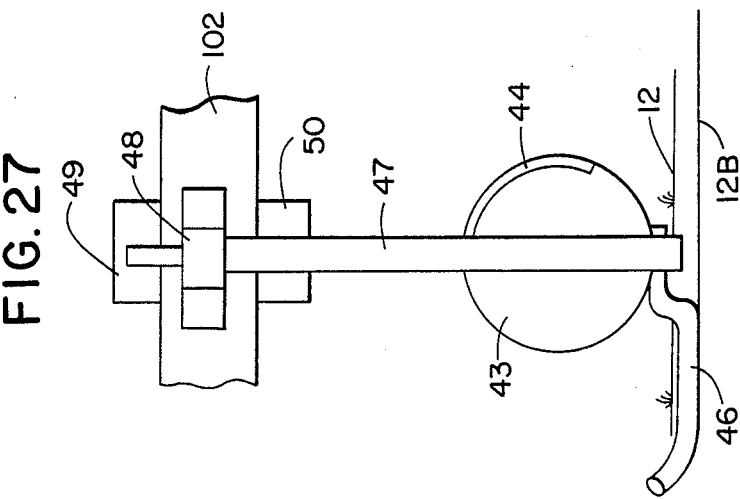
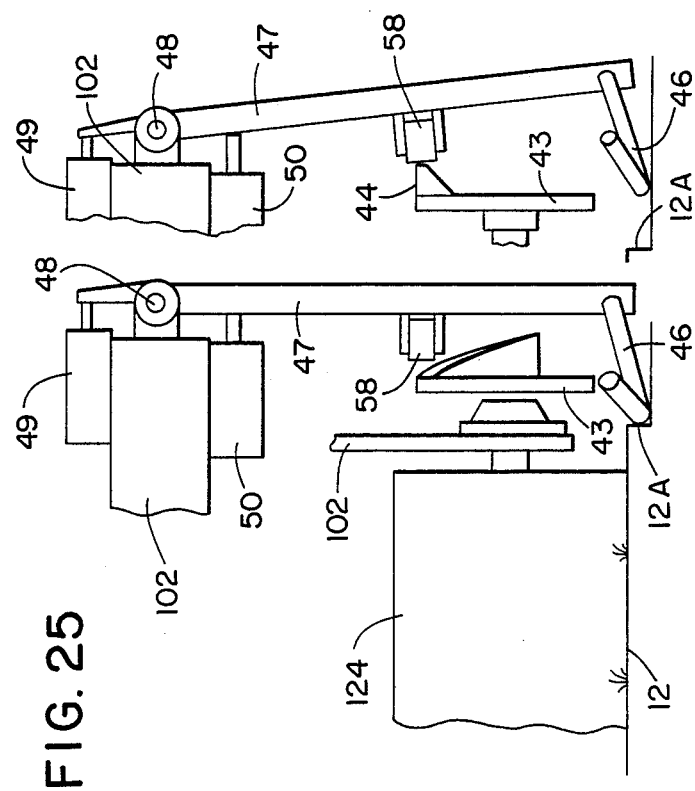

SOD HARVESTING APPARATUS

FIELD OF THE INVENTION

This invention relates to sod harvesting apparatus of the type used for cutting sod from a field into strips. More particularly, this invention relates to apparatus for cutting sod into strips and stacking the sod onto pallets.

BACKGROUND OF THE INVENTION

Sod producers conventionally harvest sod by cutting narrow strips of sod from the field and then either rolling the strips into rolls for stacking or a pallet or platform or by stacking the strips on top of each other on a platform. Apparatus conventionally used to harvest sod employs an undercutting knife to cut the sod into strips and a conveyor to transport the sod upwardly to a position where it can be grasped by a worker riding on the apparatus and then stacked manually on a pallet or other platform.

Such apparatus requires a minimum of two workers, one to operate the apparatus and one to stack the sod rolls. Because the stacking procedure is strenuous and also monotonous, the person stacking the sod must be given periodic rest periods. Sometimes two workers are used for stacking the sod in order to reduce the amount of work otherwise required by a single worker.

Although there has been proposed an automatic sod harvester which is operable by one person for cutting and stacking sod, such apparatus was extremely expensive and apparently did not achieve commercial success. It is not being marketed at this time.

There has not heretofore been provided an economical sod harvesting apparatus capable of being operated by one person for cutting sod into strips and stacking the sod onto pallets.

SUMMARY OF THE INVENTION

In accordance with the present invention there is provided, in one embodiment, self-propelled sod harvesting apparatus which is operable by one person for cutting sod from a field into strips and stacking the sod onto a pallet carried by the apparatus.

The apparatus preferably includes:
(a) wheeled frame means and an engine (e.g., a diesel engine) for powering the apparatus;
(b) sod cutting means carried by the frame and being movable between operating and transport positions; the cutting means being adapted to cut sod from the field in strips;
(c) magazine storage area for storing and carrying a plurality of pallets to be used for stacking sod on;
(d) a pallet loading area including a support platform for supporting a pallet in a generally horizontal plane;
(e) feed means for selectively transferring a pallet from the storage area to the loading area;
(f) sod receiving platform;
(g) conveyor means for conveying sod cut by the cutting means to the receiving platform;
(h) sod rolling means associated with the conveyor means for rolling the strips of sod into rolls;
(i) stacking means for transferring the rolls of sod from the receiving platform to the pallet in the loading area; and
(j) pallet discharge means for discharging a loaded pallet from the loading area.

The apparatus of the invention includes several unique features which reduce the amount of manual labor required. The apparatus can be operated by one person. Furthermore, the rolled sod does not have to be manually lifted or stacked. This greatly reduces the amount of manual effort required to harvest sod. As a result of the use of the apparatus of the invention, sod harvesting is performed much more efficiently than has conventionally been done.

The present invention also provides a unique stacking system which enables a person to grasp, lift, and selectively position several rolls of sod at one time with very little manual effort required.

The present invention also provides a unique automatic steering system for the apparatus which keeps the apparatus proceeding on the proper course without intervention by the person working on the machine. The steering system is more reliable than previously available steering systems.

Other advantages of the apparatus of the present invention will become apparent from the following detailed description and the accompanying drawings.

BRIEF DESCRIPTION OF THE DRAWINGS

The invention is described in more detail hereinafter with reference to the accompanying drawings, wherein like reference characters refer to the same parts throughout the several views and in which:

FIG. 6 is a side elevational view of one type of sod undercutting knife, which may be used in the apparatus of the invention;

FIG. 7 is a cross-sectional view taken along line 7—7 in FIG. 6;

FIG. 8 is a cross-sectional view taken along line 8—8 in FIG. 6;

FIGS. 25, 26, 27 and 28 illustrate one embodiment of automatic steering system useful in the present invention.

DETAILED DESCRIPTION OF THE INVENTION

Figure 1:
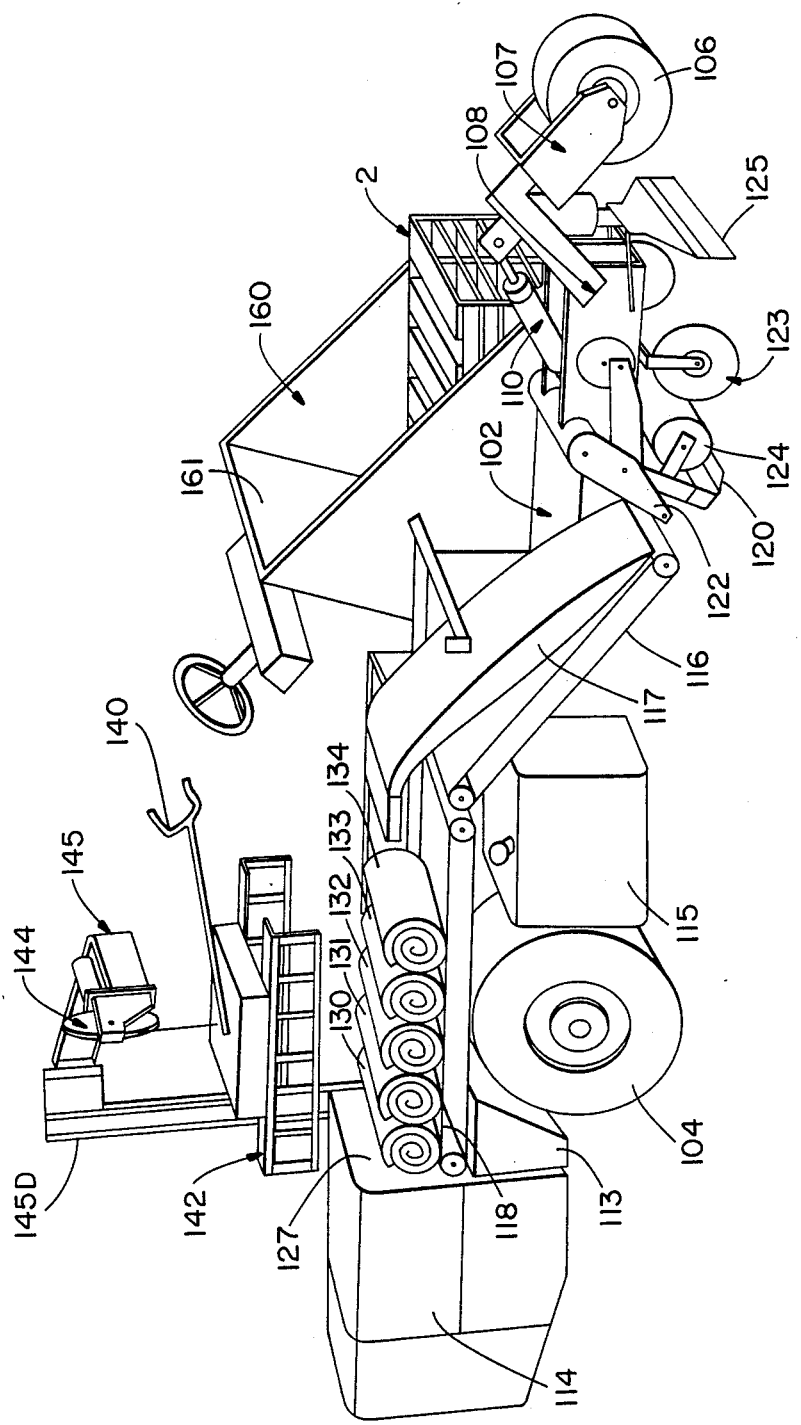
FIG. 1 is a front perspective view of the sod harvesting apparatus of the invention.
Figure 2:
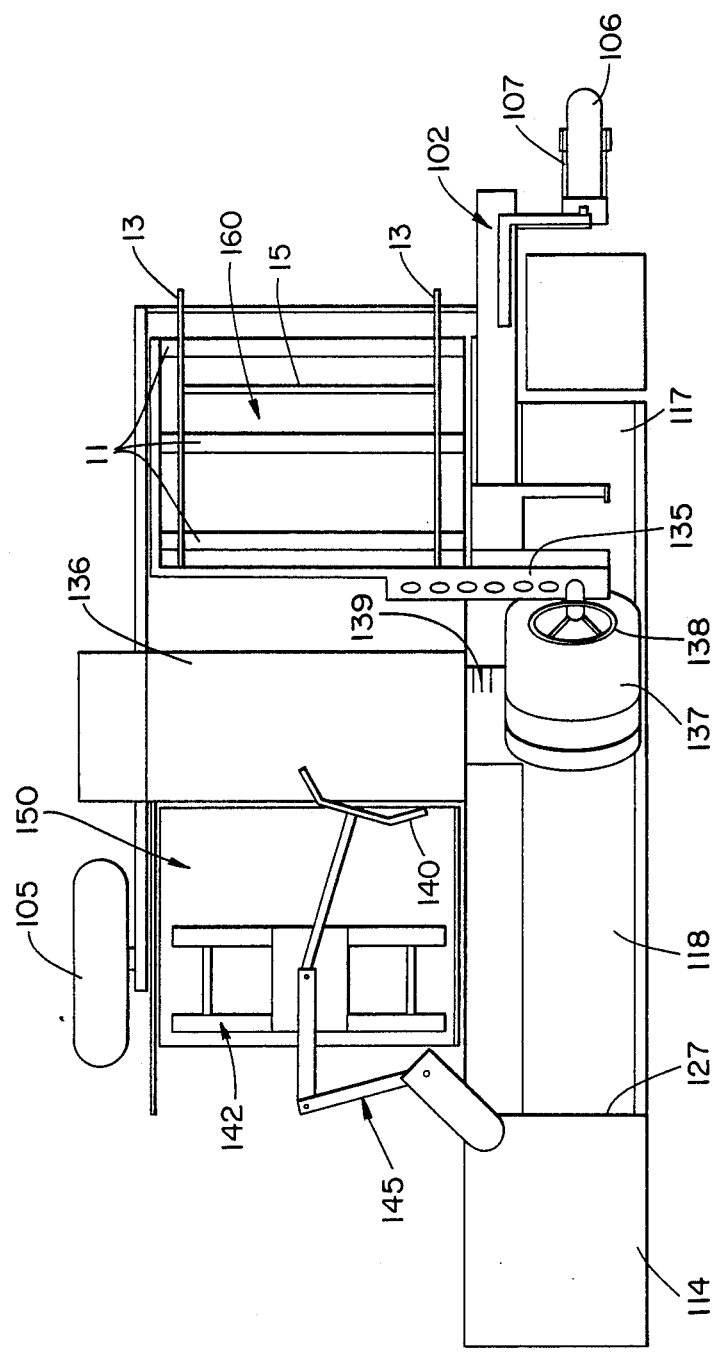
FIG. 2 is a top view of the apparatus shown in FIG. 1.

Sod harvesting apparatus 100 of the invention is illustrated in FIGS. 1 and 2. FIG. 1 is a front perspective view of the apparatus and FIG. 2 is a top view.

The apparatus includes an elongated main frame 102 supported by wheels 104 and 105. Front wheel 106 is supported by framework 107 which is pivotally mounted to the main frame 102 at point 108. Hydraulic cylinder 110 is controllable by the operator of the apparatus to raise and lower front wheel 106.

When wheel 106 is in its raised i.e., upper) position, the cutting head assembly rests upon the ground and supports the weight of the front portion of the machine. When the hydraulic cylinder 110 is extended, wheel 106 is lowered and thereby raises the cutting head free of the ground in a manner such that no part of the cutting head will contact the ground for any reason during transport.

Wheel 104 is a drive wheel for the apparatus 100. Engine 114 (e.g., a diesel engine) provides the requisite power for the apparatus to make it self-propelled. Wheel 104 is driven by a hydraulic motor. A pump contained in hydraulic reservoir 113 is driven by the engine 114 and furnishes drive power for all powered machine functions. Fuel for the engine 114 is carried in tank 115. Wheel 105 is not a drive wheel.

The sod cutting head assembly includes a sod undercutting knife 120 supported by frame work 122, a steerable coulter assembly 123 ahead of the knife 120, an adjustable gauge roller 124, and a sod cut-off knife assembly 125. The cutting head assembly is mounted to the main frame 102 on pivot points which lie in a centerline parallel to the direction of machine travel and which allow the cutting head to adapt itself to minor irregularities in the surface of the turf being cut.

Sod strips produced by the cutting head are carried upward and rearward by a first conveyor 116 directly behind the undercutting knife. This conveyor is driven at a speed which is slightly (about 2% to 6%) faster than the ground speed of the harvester. Conveyor 116 is equipped with lugs or teeth which aggressively act on the sod strip and effectively prevent slippage of the sod strip relative to the conveyor. The sod strip is trapped and compressed between conveyor 116 and a stationary upper surface 117 and is caused to form a roll as it is carried rearward and upward.

Completed rolls of sod are carried rearward by a second conveyor 118 which is caused to run at a speed approximately 25% of the speed of conveyor 116. Conveyor 118 is horizontal and has a smooth, non-aggressive surface and serves as an effective sod receiving platform.

As the rearmost roll of sod 130 reaches the rear end of conveyor 118 it encounters and is stopped by vertical surface 127. Conveyor 118 continues to run, because of its smooth surface now sliding under the stationary sod roll. In succession, additional sod rolls 131, 132, 133 and 134 are brought to rest, accumulating in a row while conveyor 118 continues to run. Although conveyor 118 is described as having a smooth surface, it is not completely frictionless. Sliding friction of conveyor 118 on sod roll 130 is resisted by vertical surface 127. In a like manner, the sliding friction exerted by conveyor 118 on sod rolls 131, 132, 133 and 134 is resisted by sod roll 130 and ultimately by vertical surface 127. It will be seen, then that each of the sod rolls accumulated on conveyor 118 is acted upon by forces tending to cause compression of the roll in a direction parallel to the direction of travel of conveyor 118, and that this compressive force is different in magnitude for each roll, being greatest for roll 130 and being least for roll 134. The effect of this compression will be discussed in more detail hereafter.

When five rolls of sod have been accumulated on the receiving platform as discussed above, the operator (who is standing on platform 136) uses handles 140 to position clamp 142 directly over the row of sod rolls on the receiving platform. Using thumb switches on handles 140, the operator causes hoist 144 to lower clamp 142 downward to encompass and clamp firmly the sod rolls. Hoist 144 is now caused to elevate the sod rolls via clamp 142. Jib crane 145 supported by upright 145D is controlled by handles 140 to move the sod rolls to the desired position over loading area 150 where a pallet will be placed. Again using the thumb switches on handles 140 the sod rolls are lowered into position on the pallet and released from the clamp. The empty clamp is then ready to be lifted by the hoist and re-positioned for another load of sod rolls.

A supply of pallets 2 is carried in magazine storage area 160 near the front of the apparatus. When a fresh pallet is required for loading sod rolls, the lowermost pallet is transferred rearwardly through an opening in the lower portion of wall 161. The mechanism for transferring a pallet to the loading area in this manner is described in more detail hereafter.

When the apparatus 100 is to be transported from point to point, rather than cutting sod, the front steerable wheel 106 is lowered to its lowermost position and the operator moves from the work platform 136 to the driving seat 137 (not shown in FIG. 1). The harvester is now controlled by the operator using instrument panel 135, control levers 139, and steering wheel 138 in the same manner as a conventional tractor.

In FIG. 2 there are no pallets shown in the magazine storage area in order to illustrate the rollers 11 and roller chains 13 for feeding the lowermost pallet from the storage area to the loading area. Feed bar 15 is also shown extending between chains 13.

Figure 3:
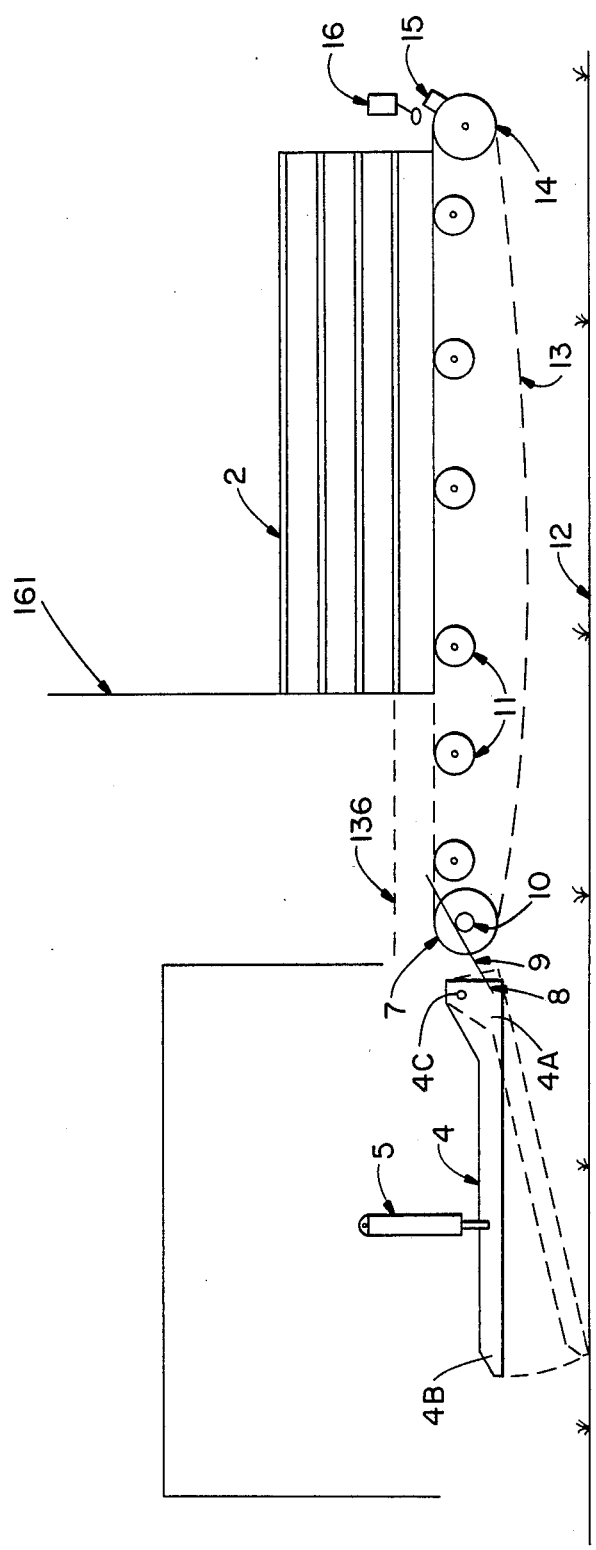
FIG. 3 is a side elevational view illustrating the feeding system for selectively transferring one pallet at a time from the magazine storage area to the pallet loading area.

FIG. 3 is a side elevational view illustrating the pallet magazine and the means for transferring one pallet at a time from the magazine storage area to the pallet loading area. The magazine allows the reserve pallets 2 to be stacked on top of each other. Each pallet is in a generally horizontal plane, as illustrated. A vertical wall 161 prevents all but the lowermost pallet from sliding rearwardly. The magazine storage area is open at the front to facilitate ease of loading and stacking pallets into the magazine. The pallets are supported underneath by means of a series of spaced-apart transverse rollers 11. A drive shaft 10 extending across the width of the pallet feed section carries two drive sprockets 7 spaced rearwardly and outwardly of the rear edge of the pallets, and is driven by a hydraulic motor, not shown.

Two loops of roller chain 13 are disposed about the sprocket 7 and extend forward to the idler sprockets 14. The top of these roller chain loops lies alongside and just outside the rails of the bottom-most pallet.

Attached to the roller chains and extending between them is a feed bar 15. When the feed mechanism is in the "cocked" position, the feed bar 5 acts upon the normally closed limit switch 16 so as to open the contacts.

Figure 4:
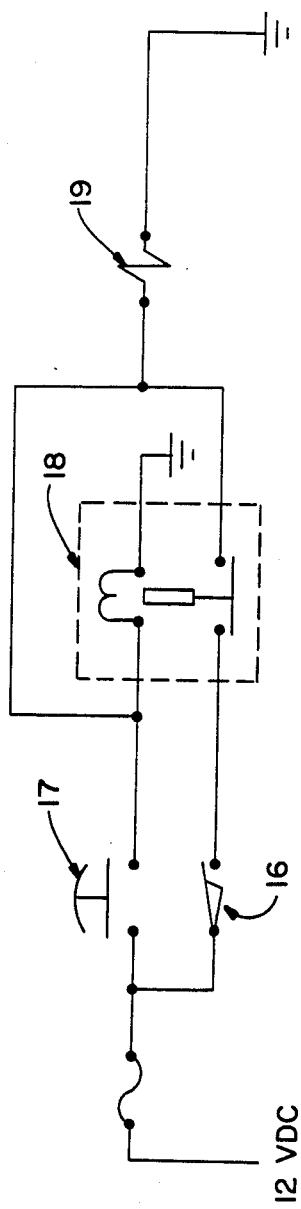
FIG. 4 is a wiring diagram illustrating how the pallet feeding system is controlled.

Referring now to the wiring diagram of FIG. 4, when the operator wants to feed a new pallet into position, pushbutton 17 is depressed. Current flows through the holding relay 18, causing the relay points to close and remain closed as long as power is supplied to the circuit and either 16 or 17 is closed. Note that if the power is interrupted, as when the machine is shut down for example, the holding relay points re-open and the feed is inoperative until the pushbutton is again depressed.

The current flowing in the energized circuit passes through solenoid 19 causing an associated hydraulic valve to open and the hydraulic drive motor for shaft 10 to operate.

Pushbutton 17 has to be held depressed long enough for feed bar 15 to get past limit switch 16. At that point, the contacts of limit switch 16 close and the feed bar will act against the bottom pallet, pushing it rearward. The hydraulic motor will continue to drive the feed bar 15 around the chain loop until it reaches the home position and again causes the contacts of limit switch 16 to open. At this time, the holding relay 18 drops out and the feed effort can only be restarted if the pushbutton is again depressed.

As the bottom pallet is being pushed rearward, it will eventually drop free from the last of the supporting rollers 11. At that point the rearmost portion of the pallet will be supported by receiving tray or platform 4 while the forward portion will drop down and come to rest on shaft 10. As the pallet continues to the rear, it finally drops free from shaft 10 and escapes the driving influence of the feed bar. At this time the feed bar is just starting to move around the arc of drive sprockets 7. If the pallet is not moved out of the way, the feed bar will come down on top of it and be unable to continue to the home position. Also, the pallet in this position is not completely on the feed tray or platform 4.

For the above reasons, a pair of fingers 9 are provided, made from ½" round bar, spaced about 2 to 3 feet apart, and pivoted at one end at point 8. As the pallet clears the last of the support rollers, it drops down on these two fingers. The fingers are long enough that they encounter feed bar 15 as it passes. The motion of the feed bar makes the fingers pivot upward and the pallet is caused to continue moving to a point completely on the receiving tray 4 and free of the feed bar. As the feed bar 15 completes its circuit of sprockets 7 and starts back to the home position, the fingers 9 drop back to their original position due to gravity.

The receiving tray or support platform 4 includes forward end 4A and trailing end 4B. The forward end is pivoted about point 4C in a manner such that the trailing end can be lowered to the ground, when it is desired to discharge a loaded pallet from the platform 4. This is done by means of hydraulic cylinder 5 controlled by a solenoid valve activated by an operator pushbutton. As the trailing end of the platform 4 is lowered, the rearward end of the loaded pallet engages the ground 12, after which the loaded pallet is dragged off the inclined platform (shown in dotted lines) onto the ground. Then the cylinder 5 raises the platform back to its original horizontal position to receive a fresh pallet from the magazine storage area.

The preferred ground clearance for the apparatus is about seven inches. Platform 136 is for the operator to stand on while operating the apparatus.

Figure 5:
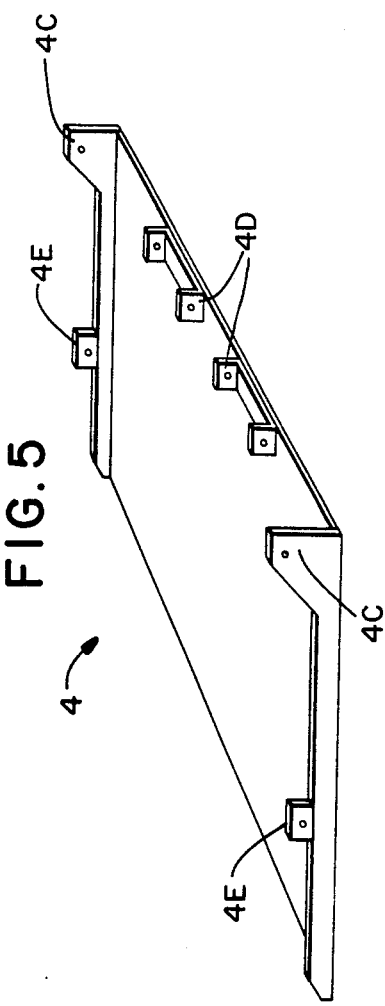
FIG. 5 is a perspective view of the support platform for supporting a pallet in the loading area.

FIG. 5 shows a perspective view of the support platform 4. The platform must be strong and rigid enough to accept up to about 3,000 lbs. of sod as a dynamic load under travel conditions and be thin enough to tilt and allow the load to be dragged off when the loaded pallet is to be dropped.

The platform shown is made from rectangular pieces of ⅜ inch thick steel plate with the two side edges formed up 2 inches for stiffness. The width inside the flanges is 49 inches (to accept 48 inch wide pallets), and the length is 36 inches. Two lugs 4E are welded on as attach points for two hydraulic support cylinders. When releasing a pallet, the platform pivots around the pivot points 4C as oil is released from the support cylinders. Two U-clips 4D are welded in place to serve as mounting points for the fingers 9 that move the pallet to its final position on the platform.

FIG. 6 shows a side elevation view of the undercutting knife 120 and its operating system. The undercutting knife is attached by means of threaded fasteners to a pair of knife holders 121 which are in turn bolted to a welded assembly consisting of a pair of arms 170, tube 171 and arm 172. Tube 171 is mounted on shaft 173 by means of rubber bushings 174.

FIG. 7 is a horizontal cross-sectional view at the center of tube 171.

In order to in all cases sever the sod roots cleanly, it is desirable that undercutting knife 120 be caused to move rapidly about 1-⅜ inches and the frequency is adjustable but is usually about 1,200 strokes per minute.

A connecting rod 175 is mounted by means of bearings 176 and threaded fasteners 177 and 177A to the outer end of crank arm 172 and to rotating shaft 180. A flywheel 178 is also mounted to shaft 180. FIG. 8 is a vertical cross-section along line 8—8 in FIG. 6. Shaft 180 is also mounted on and rotated by a hydraulic motor, not shown.

The use of flywheel 178 represents an improvement over some of the drive means on some existing harvesters. It will be understood that the force exerted at the front of the undercutting knife as it moves fore and aft varies greatly, from approximately zero at the middle of its rearward stroke to some maximum value at the middle of its forward stroke. In a low inertia system, especially where the drive means is a hydraulic motor, sufficient torque capability must be provided to overcome maximum resistance to be expected during the cutting stroke in the hardest of soils. This results in the selection of a motor of much larger displacement than is the case where suitable flywheel inertia is provided, and results in pumping unnecessarily large oil volumes and a consequent low system efficiency. Flywheel 178 is approximately 8 inches in diameter and 1 inch thick. Other types of undercutting knives may be used, if desired.

Figure 9:
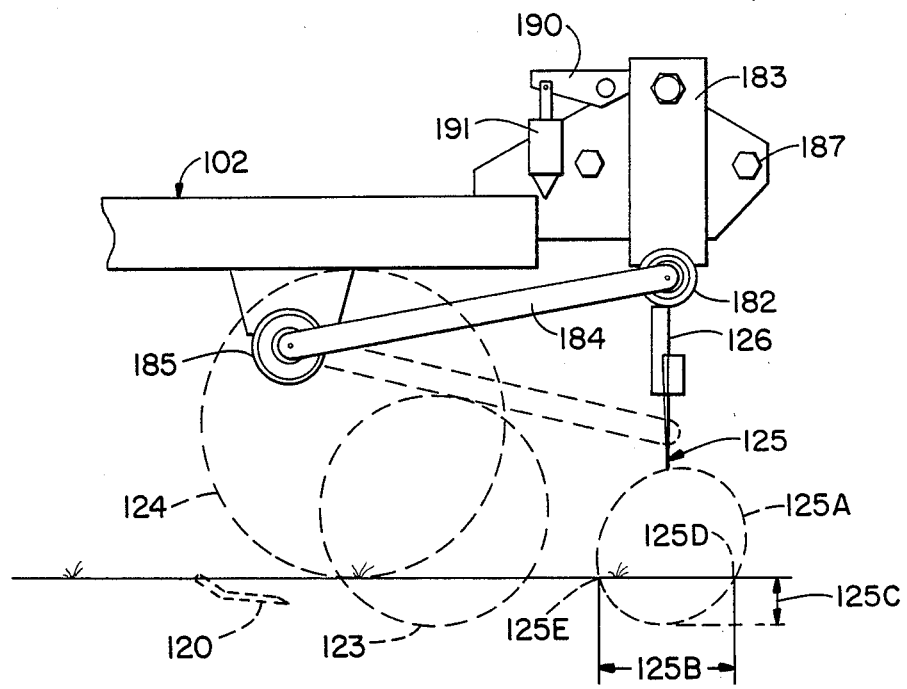
FIG. 9 illustrates a side elevational view of one type of sod cut-off knife which can be used in the apparatus of this invention.
Figure 10:
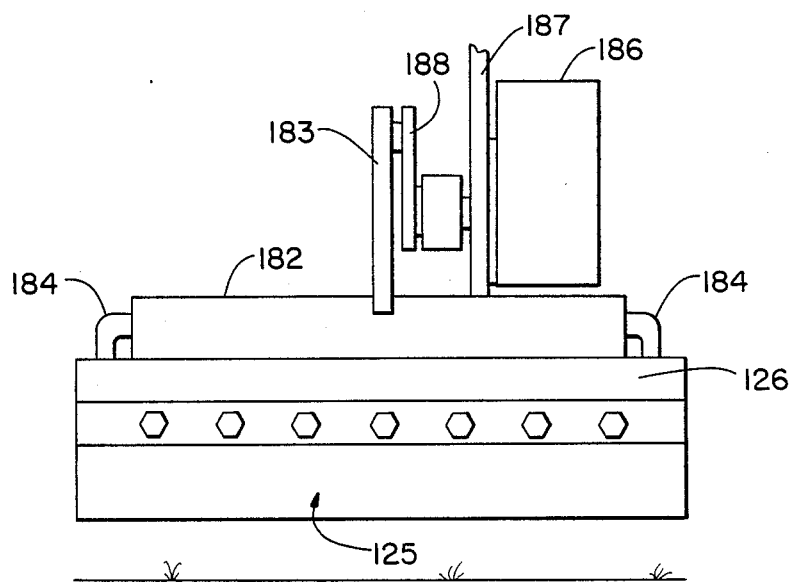
FIG. 10 is a front elevational view of the cut-off knife.

FIG. 9 is a side elevational view of a cut-off knife system used in the apparatus of this invention. FIG. 10 is a front view. The system includes a knife 125 having a continuous horizontal knife edge which extends perpendicular to the direction of travel of the apparatus and which has a width equal to the width of the sod strips to be cut by the apparatus.

The knife 125 is secured by threaded fasteners to a weldment comprising a clamp bar 126, tubular torsion mount 182, and operating arm 183. Control arms 184 are attached to main frame 102 at pivot points 185 and to the torsion mount 182.

The knife is driven by a hydraulic motor 186 mounted on a plate 187 which is attached to frame 102. Crank arm 188 is driven by hydraulic motor 186 and is pivotally attached to operating arm 183. Rotation of the hydraulic motor 186 is controlled by pawl 190 which is tripped by solenoid 191.

Approximate relative position of the coulters 123 is shown by dotted line, as is the position of the gauge roller 124 and the leading edge of the undercutting knife 120.

Total vertical travel of the cut-off knife edge is about 4 inches. The path followed by the knife edge as the apparatus moves forwardly is shown with dotted line 125A. The cutting edge of the knife will strike the ground at point 125D when it is forced downwardly and will leave the ground at point 125E after penetrating to a depth of 125C (usually about 1 inch).

The knife 125 is not provided with sufficient driving force to cause it to actually move horizontally through the ground. The harvester moves relative to the ground a distance of 125B. When the knife strikes the ground and penetrates even the slightest amount, continued forward motion of the harvester will require that the knife continue to penetrate.

The hydraulic motor used then needs to have only a nominal amount of torque, since once the knife 125 strikes the ground at point 125D, the forward motion of the harvester supplies the power requirement to complete the cutting stroke. In practice, the hydraulic motor supplies an initial penetrating force of about 100 pounds, which is sufficient to provide the initial penetration required.

Figure 11:
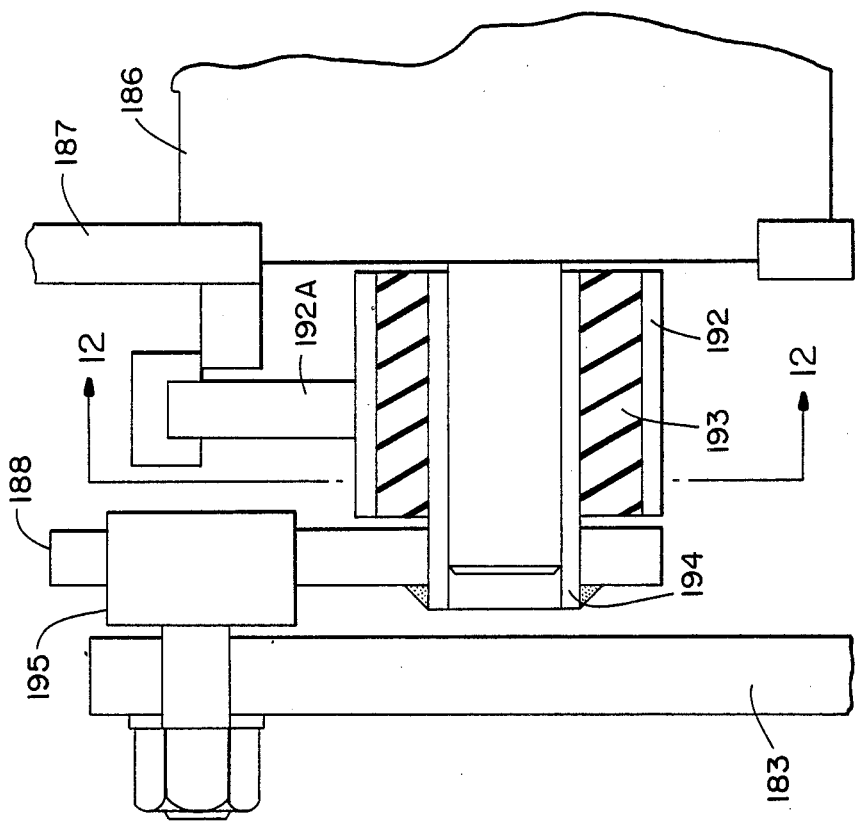
FIGS. 11 and 12 further illustrate certain details of the drive means used in the cut-off knife system.
Figure 12:
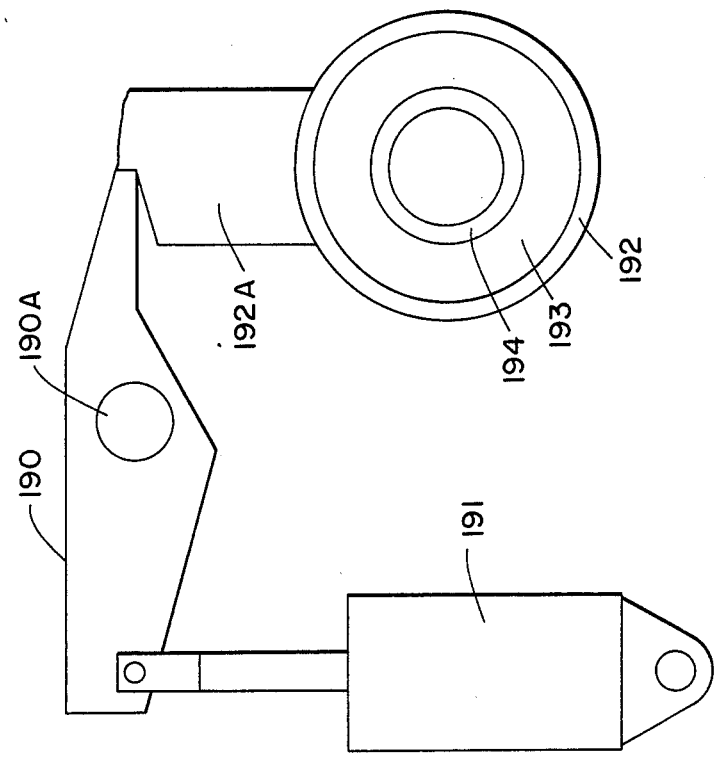

FIGS. 11 and 12 show additional features of the drive means used for the cut-off knife. A pawl 190 is normally in the position shown where it acts to prevent rotation of control arm 192A which is welded to bushing 192 which is in turn attached to hub 194 by means of elastic torque bushing 193. It will be understood that while bushing 193 is free to deform to some extent torsionally as the result of elastic shear forces, it is firmly and immovably attached to bushing 192 and hub 194. Crank arm 188 is welded to hub 194 which is rotatably attached to the shaft of hydraulic motor 186 by means of a conventional shaft key, not shown. Operating arm 183 has mounted to it a cam follower 195, the outer race of which is pressed into a hole in crank arm 188.

When the cut-off knife is to be actuated a momentary electrical current is supplied to solenoid 191 which pulls downward and acts to rotate pawl 190 about its pivot point 190A. Control arm 192A is released and the hydraulic motor starts a counter-clockwise rotation. The pawl returns to its initial position and, as the hydraulic motor completes a single rotation, control arm 192A again strikes pawl 190. Since the control arm 192A is stopped virtually instantaneously, elastic bushing 193 is provided to reduce the shock to the system. Elastic bushing 193 will typically have a torsional spring rate of about 25 lb.-in. per degree rotation.

Figure 13:
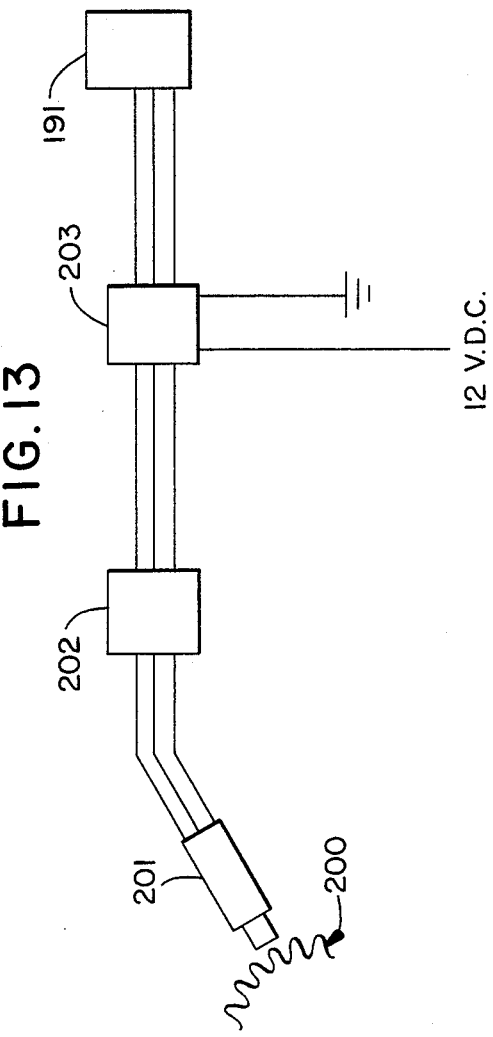
FIG. 13 is a block diagram of the electrical system which controls the cut-off knife.

FIG. 13 is a block diagram of the electrical system which controls the cut-off knife. An inductive (eddy current) pick-up 201 counts the teeth on a gear 200 in the harvester transmission and sends pulses to an electronic pre-determining counter 202. The counter is programmable by the machine operator to send a signal to relay 203 after a desired number of pulses. The number of pulses, of course, is directly related to travel distance of the harvester. The relay points close, causing solenoid 191 to operate. The signal sent by the counter to the relay is adjustable in duration and can be set to a value that assures that the solenoid is de-energized soon enough that pawl 190 has returned to its normal position well prior to the arrival of control arm 192A.

Figure 14:
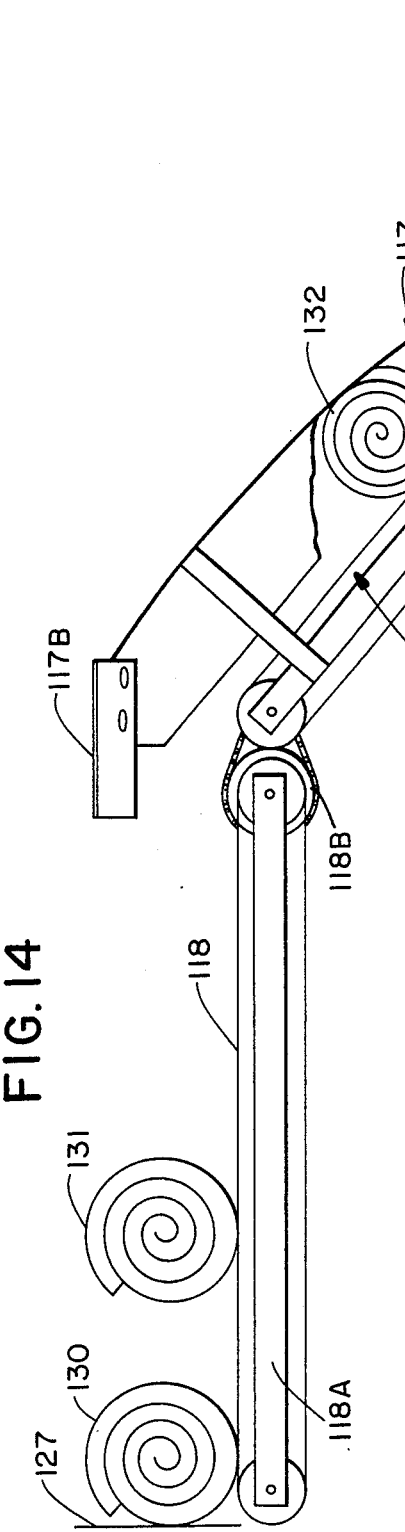
FIG. 14 is a side elevational view illustrating the conveyor means, sod rolling means, and sod receiving platform which can be used in the apparatus of the invention.
Figure 15:
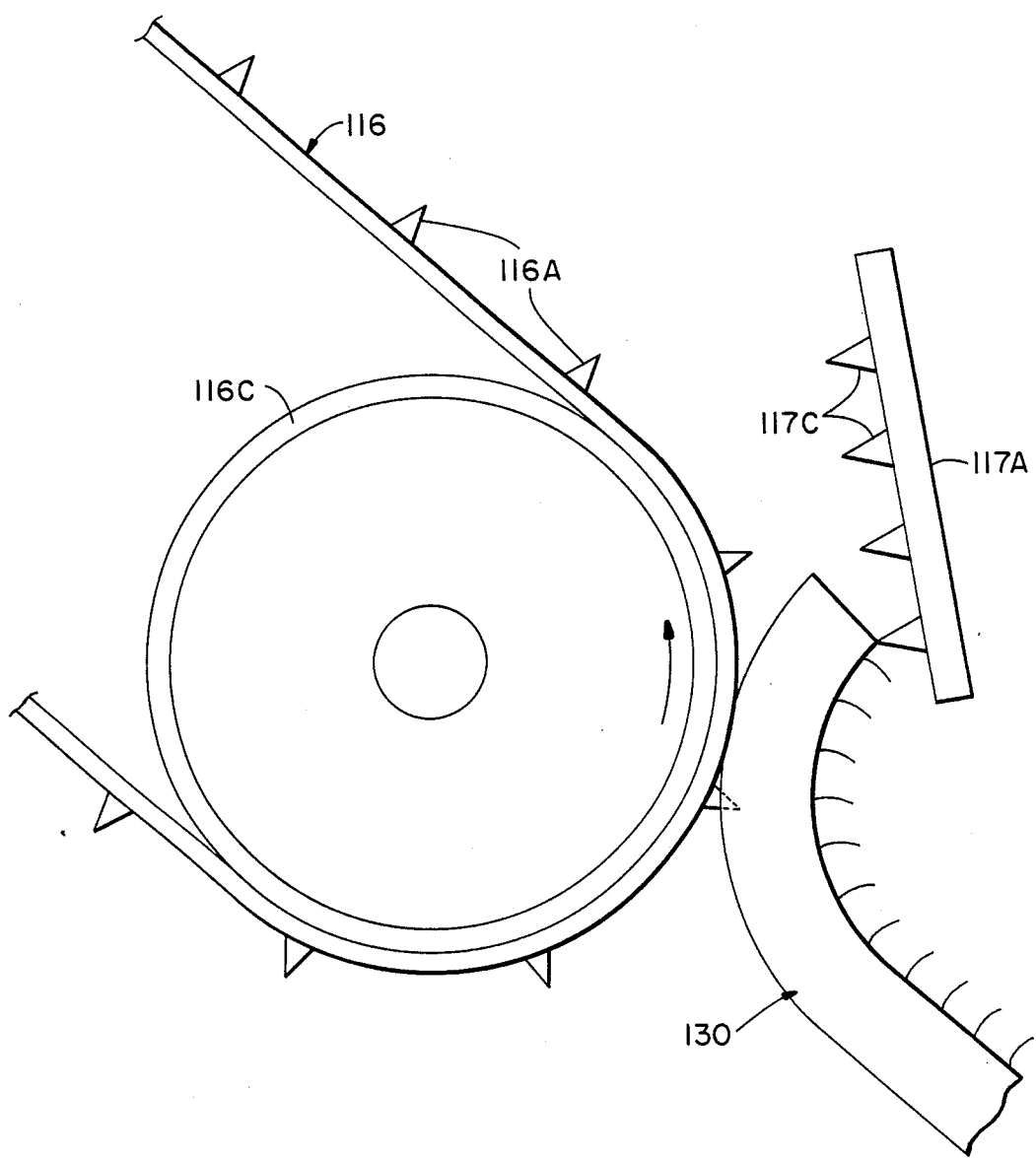
FIGS. 15, 16 and 17 are side views illustrating in more detailed the manner in which the conveyor means and sod rolling means operate to roll the strips of sod.

FIG. 14 shows the conveyor means 116, stationary upper surface 117, and sod receiving platform or conveyor 118. Conveyor 116 is driven by a hydraulic motor (not shown) at a speed preferably about 5% faster than the ground speed of the harvester apparatus and is provided with an aggressive surface such as a plurality of upstanding cleats 116A (as illustrated in FIG. 15) or the like so as to positively convey the sod strips. Striker plate 117A at the leading end of upper surface 117 initiates the rolling of the sod into a roll. Stationary upper surface 117 is adjustably mounted to frame 116B above the conveyor. At the rearward or trailing end of surface 117 there is provided a secondary, horizontal, extension member 117B which is adjustable rearwardly in a manner such that the release point where sod rolls leave the underside of surface 117 can be varied by a total distance of at least 12 inches. This adjustment allows the "flap" or loose end of the sod roll to be positioned between the 10 o'clock and 8 o'clock positions for stability in handling and transport of the sod rolls.

Conveyor 118 is supported on frame 118A and is driven by chain and sprocket means 118B from conveyor 116 at a speed of about 25% of the speed of conveyor 116. Conveyor 118 is provided with a smooth belt so as to slide under the sod rolls that are stopped by the presence of the vertical surface 127. The length of conveyor 118 is required to be sufficiently long to accommodate a minimum of five rolls of sod free from the influence of extension 117B (even when extension 117B is extended to its maximum rearward position).

As referred to above, the conveyor 116 performs the functions of forming the sod roll and elevating the roll to the receiving platform 118 where it can be handled. Forming the roll requires: (1) initiation of the roll (i.e., turning the initial end back upon the strip); (2) completing the roll, and (3) positioning the "flap" or terminal end of the strip.

Figure 16:
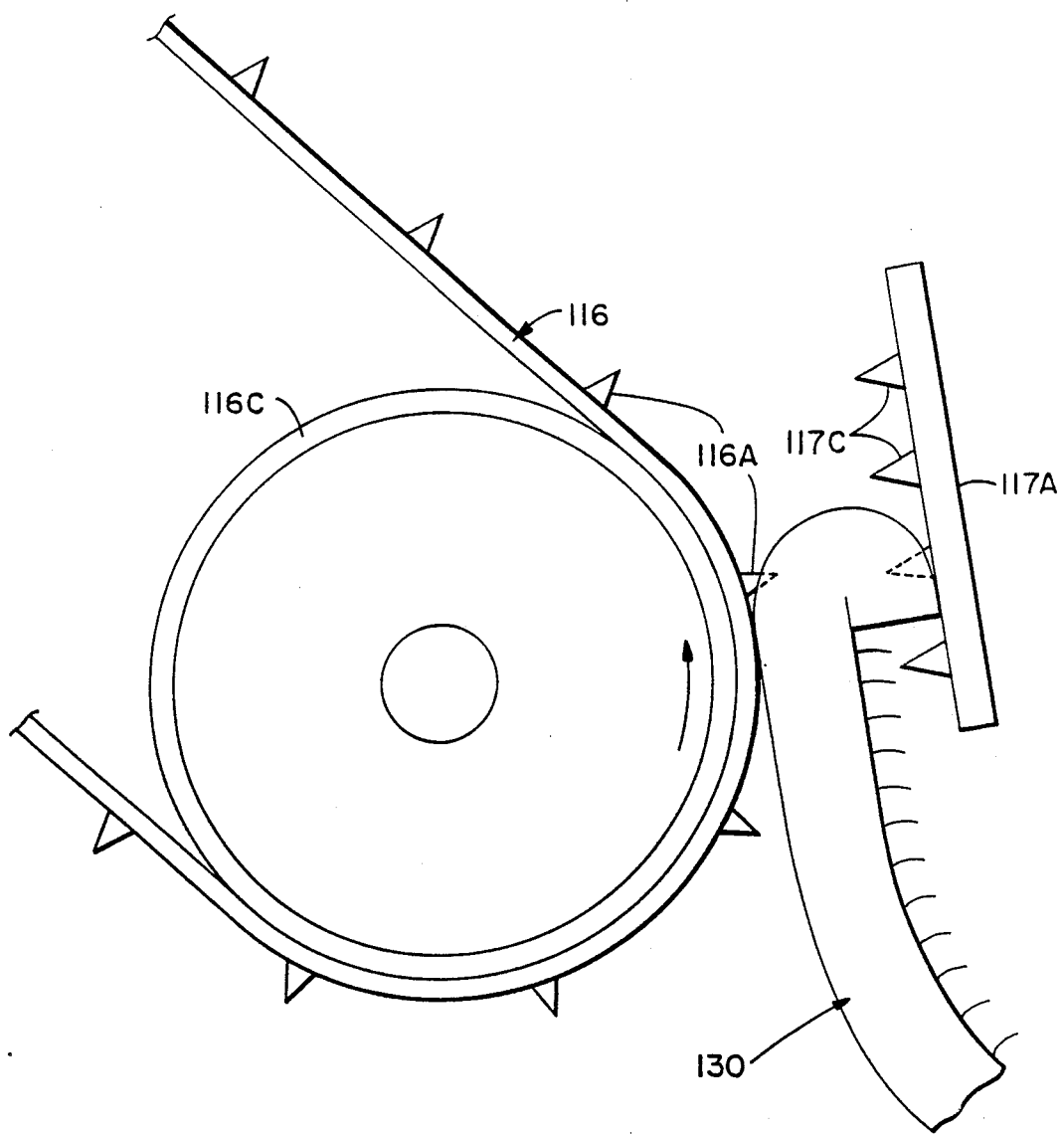

FIGS. 15 and 16 illustrate the leading end of the conveyor 116. The lower front conveyor pulley 116C is so positioned relative to the harvester cutting knife that sod strip 130, when approaching the conveyor 116, does not ride smoothly onto the top surface thereof but instead is engaged by the conveyor surface and cleats 116A and is deflected in an upward direction. A striker plate 117A equipped with cleats 117C is provided to control the initial end of the sod strip. This initial end is trapped in position and, as conveyor 116 continues to advance the sod strip, the end is turned up and back upon itself as shown in FIG. 16.

Striker plate 117A is arranged in a plane which diverges from the plane of conveyor 116 to allow room for the increase in size of the sod roll with increasing distance from the point of roll initiation. This angle of divergence is usually about 35 degrees. Striker plate 117A is adjustable with respect to conveyor pulley 116C to accommodate variations in strip thickness and field conditions.

Figure 17:
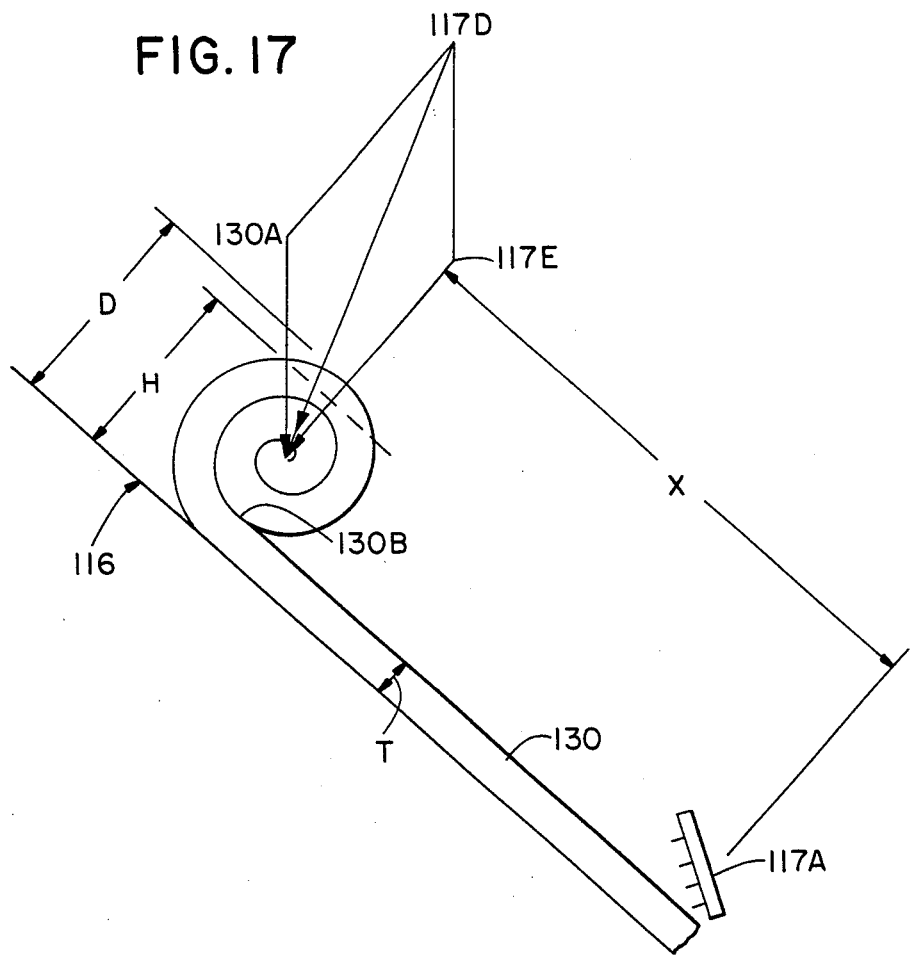

In order for rolling to continue to conclusion once initiated, the roll must be firmly held against the conveyor surface to prevent slippage between the roll and advancing sod strip. An upper or hold-down surface 117 is provided to control the rolling action once the roll passes the striker plate 117A. FIG. 17 will be used to explain the design aspects of this hold-down surface 117.

Sod rolls vary somewhat in diameter and weight, but typical figures will be used assuming a diameter of 9.5 inches and a weight of 35 pounds. Normally the apparatus of this invention is used to produce rolls 16 inches wide and 81 inches long containing one square yard of sod.

Referring to FIG. 17, sod strip 130 is being aggressively driven upwardly by conveyor 116 because of the presence of cleats 116A. The weight of the sod roll is shown by force vector 130A and will cause slippage between the roll and the underlying sod strip at point 130B at steep conveyor angles. A compressive force applied normal to the conveyor surface will result in new load direction and magnitude represented by vector 117D. If the tangent of the angle formed by vector 117D with a line at right angles to the conveyor surface is less than the coefficient of friction at point 130B, then slippage will not occur and rolling will continue.

It will be understood that the frictional coefficient described above can vary widely depending upon actual conditions. The force applied at vector 117E then is purposely made quite high so as to assure tight rolls under all conditions. A force sufficient to compress the roll diameter by 15 to 20% is usually sufficient.

A roll a distance X from the roll initiation point will have a free diameter D and will be compressed to height H by the presence of the hold-down surface 117 above the conveyor. Since the velocity of the roll at the point contacting the hold-down or upper surface is zero, and the velocity at the conveyor surface is the same as the conveyor velocity, then the mean roll velocity at the center of the roll is exactly half the conveyor speed, and the length of sod strip at any point X distant from the roll initiation point will be 2X.

Assuming the finished roll will have a free diameter of 9.5 inches and be 81 inches long, the average thickness T of the sod strip would be:

$$T = \frac{\pi}{81}\left(\frac{9.5}{2}\right)^2 = 0.875$$

The free diameter of a roll at any distance from the roll initiation point would be:

$$D = 2\sqrt{\frac{(0.875)(X)(2)}{\pi}}$$

and the compressed height H (for a 20% squeeze) would be:

$$H = (0.80)(2)\sqrt{\frac{(0.875)(X)(2)}{\pi}}$$

Simplifying and combining, we find that under these conditions, the distance from the conveyor surface to the hold-down surface at any distance X from the point of roll initiation is:

$$H = 1.194\sqrt{X}$$

After initiation at striker plate 117A the roll is completed by being trapped between the flat moving conveyor surface 116 and a hold-down surface 117 which is adjustable to accommodate variations in sod thickness and field conditions but which generally has a parabolic shape in a side elevation view in conformation with the above formula.

Thickness and physical characteristics of the sod cut on any individual farm are generally uniform enough that the hold-down or upper surface 117, once set, requires little or no adjustment.

Figure 18:
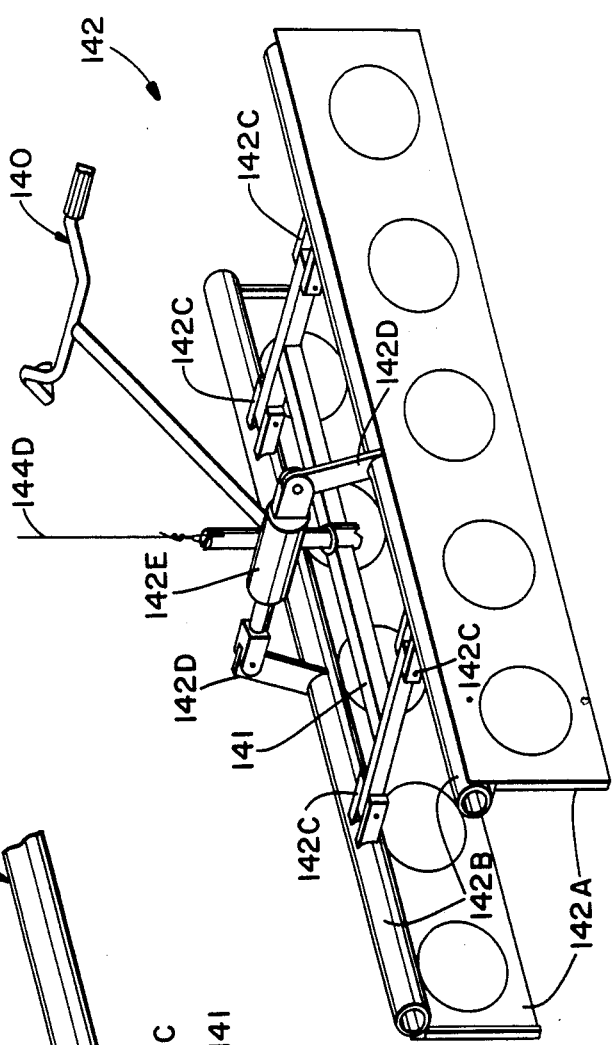
FIG. 18 is a perspective view illustrating the roll lifting and stacking system of the invention.
Figure 20:
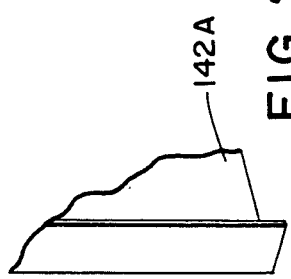
FIG. 20 illustrates the manner in which the ends of the clamping plates are flanged.

FIG. 18 is a perspective view of the clamp 142 comprising opposing clamping plates 142A which are preferably made from about 14 gauge high strength low alloy steel sheet and are about 47 inches long and about 8 inches high. A pattern of relief holes is provided to increase unit pressure on the sod rolls and improve holding power. When the sod rolls are grasped by clamp 142 the rolls are under some compressive load. To maintain this load, and to restrain the roll on each end from moving horizontally out of the clamp, the ends of the clamp plates are preferably flanged slightly inward as illustrated in FIG. 20.

The clamp plates are reinforced full length along their top edge by round tubes 142B. The tubes 142B are pivotally attached by means of lugs 142C to frame member 141. Also welded to tubes 142B are upstanding arms 142D which provide the mounting points for hydraulic cylinder 142E.

Figure 19:
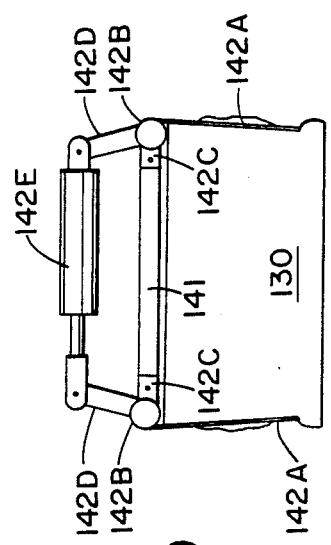
FIG. 19 is an end view illustrating the manner in which the stacking system grasps the sod rolls on the receiving platform.

When the clamp plates are parallel, the distance between them is equal to the length of the sod rolls (usually 16 inches) to be lifted and carried. When the hydraulic cylinder 142E is fully retracted, the distance between the clamp plates at the bottom or lower edges is about 16-⅝ inches, and when the hydraulic cylinder is fully extended the distance between the plates is reduced to about 15 inches. FIG. 19 is an end view of the clamp showing a sod roll 130 squeezed between the clamp plates.

Figure 21:
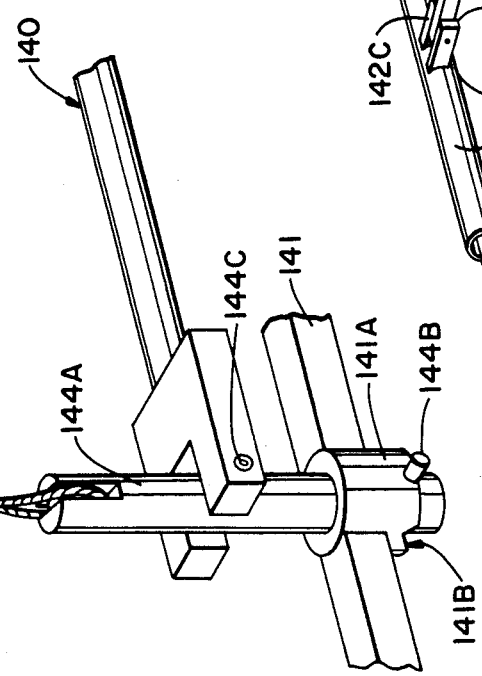
FIG. 21 is a perspective view illustrating a portion of the hoist system used to lift the sod rolls.

As shown in FIG. 21, the roll carrier frame 141 is provided with a centrally positioned bushing 141A which has four equally spaced notches 141B at its lower end. Support shaft 144A has a pin 144B fixed transversely at its lower end which is adapted to engage an opposed pair of notches 141B when control handle 140 is either parallel to or at right angles to the fore and aft centerline of the roll carrier.

The control handle 140 is equipped with hand grips which include control switches (not shown) for operating the hoist and clamp functions of the roll carrier system. Control handle 140 is pivotally attached to support shaft 144A by means of pin 144C. The roll carrier is supported by cable 144D which is attached to the upper ends of support shaft 144A.

Figure 22:
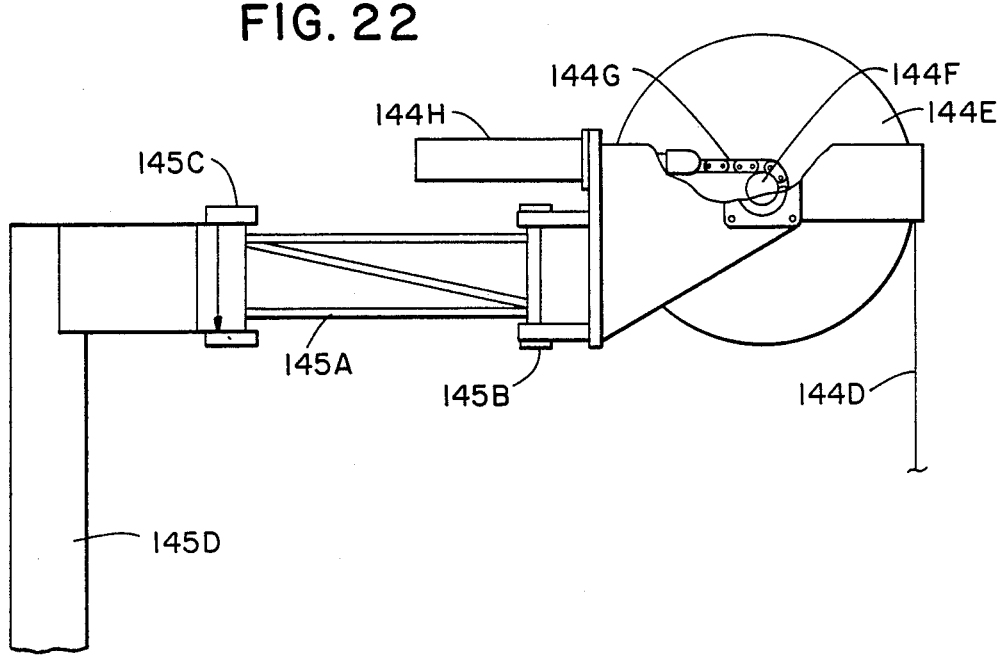
FIG. 22 is a side elevational view illustrating the jib hoist system.

FIG. 22 is a side elevational view of the jib hoist 144 that supports the roll carrier. Cable 144D is wound on drum 144E which is fixed to shaft 144F. Roller chain 144G has one end attached to shaft 144F and the other end to the rod end of hydraulic cylinder 144H. Dimensions and relationships between these components are such that the full stroke of this cylinder will cause shaft 144F to rotate slightly less than one complete revolution, and cable 144D will raise or lower the roll carrier system the maximum required distance.

In a preferred embodiment the cylinder 144H has a 5 inch stroke, 1-¼ inch bore, and ⅝ inch rod diameter. Shaft 144F is 1-¼ inch in diameter and drum 144E is 12 inches in diameter.

The hoist assembly is mounted to inner arm 145A by means of pivot pin 145B. Arm 145A is mounted to support structure 145D by means of pivot pin 145C. There may be more than one pivot arm, if desired.

Figure 23:
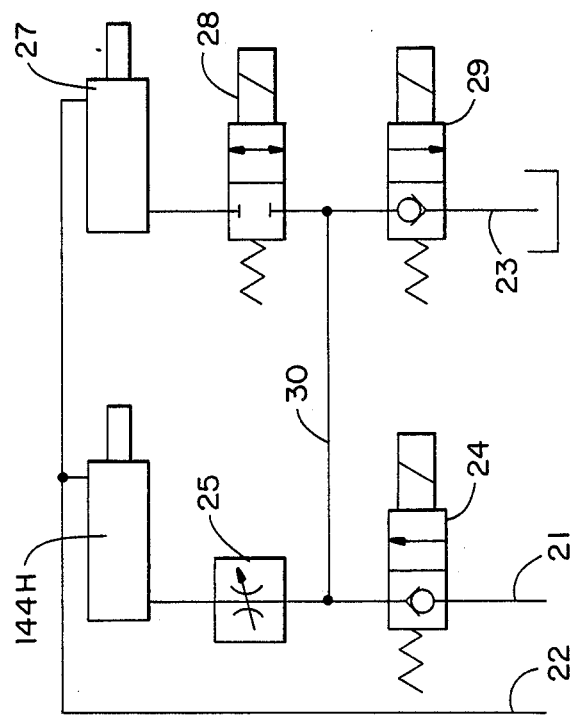
FIG. 23 is a schematic diagram illustrating the hydraulic system used to control the stacking system.

FIG. 23 is a schematic diagram of the hydraulic system operating the roll carrier hoist and clamp. Line 21 is connected to a source of high pressure (1,900 psi) oil. Line 22 is connected to a source of low pressure (250 psi) oil. Line 23 is drained to the reservoir. The speed of operation of hoist cylinder 144H is controlled by flow regulator valve 25. When the solenoid of valve 24 is energized, hydraulic cylinder 144H will act to raise the roll carrier except that, if the solenoid of valve 28 is energized at the same time, hydraulic oil will preferentially flow to clamp cylinder 27 and the roll carrier will not start to rise until the clamp plates on the roll carrier are completely in a clamped position on the sod roll. This action occurs because the pressure requirements have been so designed that more oil pressure is required to lift the roll carrier than to operate the clamp. Solenoid valves 24 and 29 are operated by a single three-position switch located on control handle 140. When the solenoid of valve 29 is energized, oil from the hose cylinder 144H is drained to tank and the roll carrier is lowered. When the sod rolls being moved have reached a supporting surface (i.e., pallet), the solenoid of valve 28 may be energized and the clamp plates will open up, releasing the sod rolls. Note that the sod rolls cannot be released from the clamp plates by opening valve 28 unless valve 29 is also open and unless the pressure has been relieved from the hydraulic system at point 30. It is thus impossible to inadvertently drop the rolls of sod from the carrier while still suspended in the roll carrier.

Figure 24:
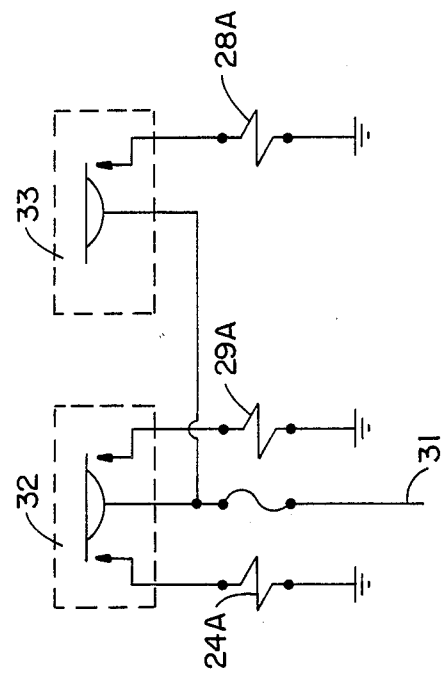
FIG. 24 is an electrical schematic of the control system for the roll lifting and stacking system.

FIG. 24 is an electrical schematic of the control system for the roll carrier clamp and hoist systems. Wire 31 is connected to a source of electrical power. Thumb switch 32 can energize either the coil 24A of valve 24, or the coil 29A of valve 29. Thumb switch 33 is able to energize the coil 28A of valve 28.

Most pallets that sod is transported on are a nominal 48 inches in at least one dimension. This is because material handling and transportation costs are important to the final cost to the customer, and the flat-bed trucks commonly used for transporting sod from the grower are 8 feet wide.

When sod is placed on a pallet for transport, layers are alternated in orientation to increase the stability and help keep rolls from being lost during transportation. This is called "cross-tying."

The hoist and roll carrier system described herein serve well as a stacking system in the apparatus of this invention. The stacking system enables a single operator to lift 5 rolls of sod at a time from the receiving platform and then stack the rolls directly on a receiving pallet in the loading area. The stacking system described enables three rows of five rolls each to be loaded with alternative orientation, using a 16 inch roll width.

Thus, the stacking system of the invention enables the operator to move sod from the receiving platform to the pallet without manual lifting of each roll. Rather, the hydraulic clamp will grasp and tightly hold the sod rolls, thereby enabling the operator to maneuver the load to the receiving pallet. As the load is moved to the receiving pallet, the operator can easily orient the load to the desired direction or orientation, after which the load may be lowered. Then the clamp can be opened to release the sod rolls.

Figure 28:
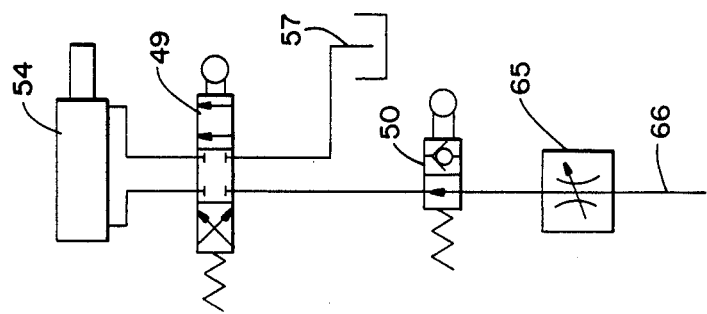

FIGS. 25 and 26 show a front elevational view of the essential components of the automatic steering control system which is preferably used in the apparatus of this invention. FIG. 27 is a side elevational view of some of the components of the steering system. FIG. 28 is a schematic diagram of the hydraulic system used for the automatic steering function.

Steering control is achieved by a sensing finger 46 that is spring biased against the vertical surface 12A marking the border between elevation 12B where sod was previously cut, and elevation 12 which is as yet uncut turf. Sensing finger 46 is pivotally mounted to lever 47 at its lower end and lever 47 is pivotally mounted to machine frame 102 at pivot point 48. Cam operated hydraulic valves 49 and 50 are operated by the position of the lever 47.

Leaving aside hydraulic valve 10, the general steering system so far described is well known in the industry and has been used for some years. A problem is encountered with these previous auto-steer systems when the sensing finger 46 encounters a condition which causes it to be lifted enough to escape vertical surface 12A and above, because of its spring biasing force, over onto the top of uncut turf at elevation 12. This results in displacement of lever 47 and a resultant displacement of the spool of valve 49. Valve 49 is connected to the harvester steering system, and said spool displacement causes the harvester to be steered in the direction of vertical surface 12A, which causes sensing finger 46 to move even further from its home point of surface 12A. Unless the driver of the harvester is very alert, the harvester will cut an arc-shaped strip of sod far out of, and steadily diverging from, the intended path. This results in considerable loss of product as the harvester encounters this cut area on subsequent trips around the field. It will be understood that commercially-marketed strips of sod are desired to be rectangular in shape and of uniform length, causing the arc-shaped scar in the sod field to result in the loss of much more sod than just the amount removed during the steering mishap.

In an effort to correct this problem, my invention involves the addition of a cam surface 44 on disc 43 which acts against cam follower 58 with each revolution of the gauge roller 124, so that sensing finger 46 is caused to move well away from vertical surface 12A at regular intervals and then immediately return. In practice, the gauge roller diameter is about 8 inches, so the said camming action occurs approximately once in every two feet of harvester travel. When the lever 47 is forced outward by the action of cam 44 as shown in FIG. 26, valve 49 is operated so as to require the harvester to turn away from vertical guide surface 12A. To overcome this tendency and smooth out the steering action a second, two-way normally open valve 50 preferably is provided which closes off the oil supply to valve 49 momentarily while lever 47 is being acted upon by cam 44.

In the steering system of this invention, if sensing finger 46 is caused for any reason to lift up and escape the guidance of the vertical surface 12A, the camming action just described will cause sensing finger 46 to be swung outward and released to again engage vertical surface 12A before the harvester has gone more than 2 feet, in which distance it will not have been able to leave the desired steering track by more than a fraction of an inch.

This constantly repeated searching action of the guide finger 46 largely eliminates the most common problem found with the guidance systems currently in use on sod harvesters.

Referring now to FIG. 28, hydraulic line 66 is connected to a source of high pressure (1,900 psi) hydraulic oil. Line 56 is drained to the reservoir. A flow control valve 65, not shown elsewhere, may be provided to control the rate of steering correction. Two-way valve 50 is normally open, and is closed only when lever 47 is deflected by cam 44. Three position 4-way hydraulic valve 49 is in the centered position as shown when the harvester is on course and when lever 47 is not deflected by cam 44. If the harvester starts to deviate from the desired course as detected by sensing finger 46 bearing on vertical guide surface 12A, lever 47 acts on the spool of valve 49 to cause a correcting flow of oil to steering cylinder 54.

Figure 30:
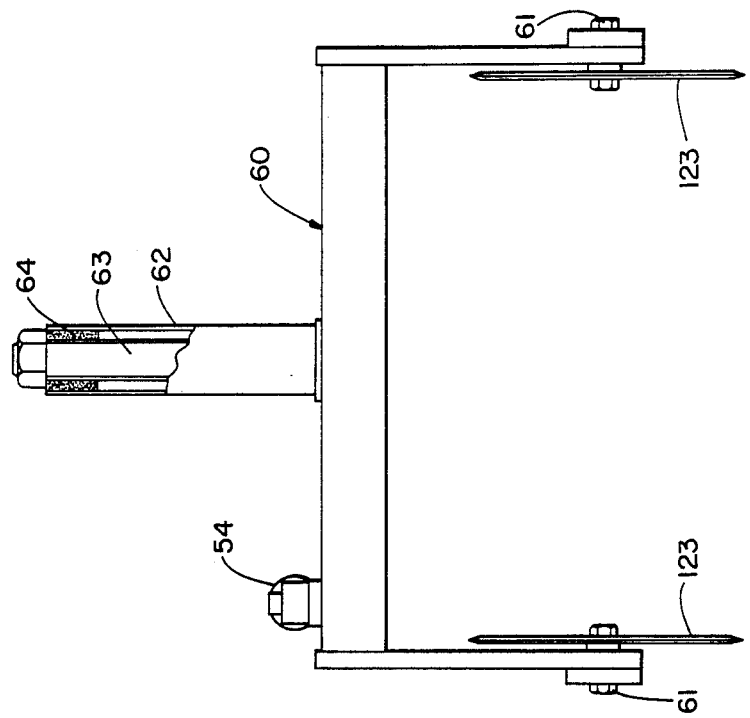
FIGS. 29 and 30 illustrate one embodiment of coulter steering assembly used in the apparatus of this invention.
Figure 29:
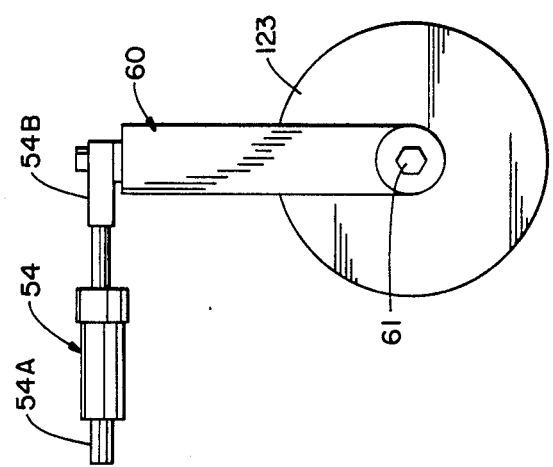

Referring now to FIGS. 29 and 30, steering cylinder 54 is attached at one end 54A to the frame portion of the cutting head and at the other end 54B to the frame 60 of the coulter assembly. A round tube 62 is rigidly attached to and is a part of the cutting head frame. The coulter frame 60, of which kingpin 63 is a part, is pivotally mounted in the tube 62 by means of elastic torsion bushings 64. The action of cylinder 54 causes coulter frame 60 to pivot about the centerline of tube 62. Coulters 123 are mounted on frame 60 by means of bearings 61. The spacing between the coulters is the width of the sod strip, usually 16 inches. Coulter diameter on the harvester is about 6 inches. When the automatic steering system senses the harvester to be "on course", the cylinder 54 keeps the coulters pointed so that their diameter is parallel to the harvester centerline. If a steering correction is required, cylinder 54 causes frame 60 to pivot so that the planes containing the coulters assume an angle with respect to the harvester fore and aft centerline. There is a very high force requirement involved in moving the coulter blades sideways in the turf, and this force moves the cutting head in the desired direction to provide the needed course direction.

Other variants are possible without departing from the scope of this invention.

What is claimed is:

1. Self-propelled sod harvesting apparatus which is operable by one person for cutting and from a field into strips and stacking said sod on a pallet, said apparatus comprising:
    (a) wheeled frame means and an engine for powering said apparatus;
    (b) sod cutting means carried by said frame and being movable between operating and transport positions; said cutting means being adapted to cut sod from said field;
    (c) magazine storage area for storing and carrying a plurality of pallets; said magazine storage area being spaced laterally from said sod cutting means;
    (d) a pallet loading area including a support platform for supporting a pallet in a generally horizontal plane; said loading area being located rearwardly of said magazine storage area;
    (e) feed means for selectively transferring a pallet from said storage area to said loading area;
    (f) sod receiving platform which is capable of receiving and accumulating a plurality of said rolls in side-by-side manner;
    (g) conveyor means for conveying sod cut by said cutting means to said receiving platform;
    (h) sod rolling means associated with said conveyor means for rolling said strips of sod into rolls;
    (i) sod stacking means for transferring said rolls of sod from said receiving platform to said pallet in said loading area; wherein said stacking means comprises clamping means pivotably supported by said frame means; wherein said clamping means is adapted to engage and transfer said plurality of sod rolls from said receiving platform to said pallet in said loading area;
    (j) pallet discharge means for discharging a loaded pallet from said loading area; and
    (k) steering means adapted to steer said apparatus across said field automatically.

2. Apparatus in accordance with claim 1, wherein said magazine storage area is capable of supporting said plurality of pallets in a stack, and wherein said feed means is adapted to transfer the lowermost pallet in said stock to said loading area.

3. Apparatus in accordance with claim 1, wherein said support platform of said loading area is pivotably supported and includes forward and rearward ends; and wherein said discharge means comprises a hydraulic cylinder for selectively lowering and raising said rearward end of said support platform; and wherein said pallet in said loading area extends rearwardly past said rearward end of said support platform in a manner such that said pallet engages the ground when said rearward end of said platform is lowered.

4. Apparatus in accordance with claim 1, wherein said clamp includes opposing jaw members which are movable between closed and open positions by means of a power cylinder.

5. Apparatus in accordance with claim 4, wherein said cylinder is hydraulic, and wherein said clamp means is supported from a folding arm.

6. Apparatus in accordance with claim 1, further comprising an operator platform for said person; wherein said magazine storage area is located forwardly of said operator platform and said pallet loading area is located rearwardly of said operator platform.

7. Apparatus in accordance with claim 1, wherein said steering means comprises:
    (a) a pivotally mounted sensing arm adapted to sense the location of a vertical surface between uncut sod and ground level where sod has been removed;
    (b) cam means adjacent said sensing arm, said cam means being adapted to periodically urge said sensing arm away from said vertical surface; and
    (c) spaced-apart coulters which penetrate the ground, wherein said coulters are rotatably carried by said apparatus and are adapted to be pivoted relative to the centerline of said apparatus in order to steer said apparatus.

8. Apparatus in accordance with claim 7, further comprising hydraulic means adapted to pivot said coulters in response to movement of said sensing arm relative to said vertical surface.

9. Self-propelled sod harvesting apparatus which is operable by one person for cutting sod from a field into strips and stacking said sod on a pallet, said apparatus comprising:

(a) wheeled frame means and an engine for powering said apparatus;
(b) sod cutting means carried by said frame and being movable between operating and transport positions; said cutting means being adapted to cut sod from said field;
(c) a pallet loading are including a support platform for supporting a pallet in a generally horizontal plane;
(d) sod receiving platform which is capable of receiving and accumulating a plurality of sod rolls in side-by-side manner;
(e) conveyor means for conveying sod cut by said cutting means to said receiving platform;
(f) sod rolling means associated with said conveyor means for rolling said strips of sod into rolls;
(g) sod stacking means for transferring said rolls of sod from said receiving platform to said pallet in said loading area; wherein said stacking means comprises clamping means pivotably supported by said frame means; wherein said clamping means is adapted to engage and transfer said plurality of sod rolls from said receiving platform to said pallet; and wherein said clamping means includes opposing jaw members which are movable between closed and open positions by means of a power cylinder;
(h) pallet discharge means for discharging a loaded pallet from said loading area; and
(i) steering means adapted to steer said apparatus across said field automatically.

10. Apparatus in accordance with claim 9, wherein said support platform of said loading area is pivotably supported and includes forward and rearward ends; and wherein said discharge means comprises a hydraulic cylinder for selectively lowering and raising said rearward end of said support platform, and wherein said pallet in said loading area extends rearwardly past said rearward end of said support platform in a manner such that said pallet engages the ground when said rearward end of said platform is lowered.

11. Apparatus in accordance with claim 10, wherein said cylinder is hydraulic, and wherein said clamp means is supported from a folding arm.

12. Apparatus in accordance with claim 9, wherein said sod receiving platform comprises a horizontal moving conveyor having first and second ends and having a smooth surface; wherein said sod rolls are receiving at said first end; and further comprising a vertical surface adjacent said second end for limiting travel of said sod rolls past said second end.

13. In sod harvesting apparatus of the type including cutting means for harvesting strips of sod from a field, wherein removal of a strip of sod from said field by said apparatus leaves a vertical surface between uncut sod and ground level where sod has been removed, the improvement which comprises an automatic steering system comprising:
(a) a pivotally mounted sensing arm adapted to sense the location of said vertical surface;
(b) cam means adjacent said sensing arm, said cam means being adapted to periodically urge said sensing arm away from said vertical surface; and
(c) steering means controlled by said sensing arm for steering said harvesting apparatus.

14. The improvement of claim 13, wherein said steering means comprises spaced-apart coulters which penetrate the ground, wherein said coulters are rotatably carried by said apparatus and are adapted to be pivoted relative to the centerline of said apparatus in order to steer said apparatus.

15. The improvement of claim 14, further comprising hydraulic means adapted to pivot said coulters in response to movement of said sensing arm relative to said vertical surface.

16. The improvement of claim 15, wherein said coulters are rotatably carried on opposite ends of an elongated frame which is pivotally mounted on said apparatus.

17. In sod harvesting apparatus of the type including cutting means for harvesting strips of sod from a field, wherein said strips are rolled into rolls and positioned on a receiving platform; the improvement which comprises:
(a) a sod receiving platform capable of receiving a plurality of said rolls in side-by-side manner;
(b) an upright support member carried by said apparatus;
(c) an arm member having first and second ends, wherein said first end is pivotally secured to said support member;
(d) hoist means carried by said second end of said arm member;
(e) clamp means carried by said hoist means for releasably grasping said rod rolls; said clamp means including closed and open positions;
(f) hand control means for controlling said hoist means and said clamp means;
(g) a sod loading area;
wherein said hoist means is adapted to raise and lower said clamp means, wherein said clamp means is adapted to be moved between said closed and open positions, in response to said hand control means, and wherein said hoist means and said clamp means are provided for moving said sod rolls from said receiving platform to said loading area.

* * * * *